(12) United States Patent
King

(10) Patent No.: US 9,002,873 B1
(45) Date of Patent: Apr. 7, 2015

(54) PIPELINE QUERY INTERFACE

(75) Inventor: Jared King, San Francisco, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 13/149,450

(22) Filed: May 31, 2011

(51) Int. Cl.
*G06F 7/00* (2006.01)
*G06F 17/30* (2006.01)
*G06Q 50/18* (2012.01)

(52) U.S. Cl.
CPC .................................. *G06Q 50/18* (2013.01)

(58) Field of Classification Search
CPC ..................... G06F 17/30554; G06F 17/30696
USPC ......................................................... 707/766
See application file for complete search history.

(56) References Cited

U.S. PATENT DOCUMENTS

| | | | |
|---|---|---|---|
| 5,566,330 A * | 10/1996 | Sheffield ................................ | 1/1 |
| 5,911,138 A * | 6/1999 | Li et al. .................................. | 1/1 |
| 7,058,661 B2 * | 6/2006 | Ciaramitaro et al. ................ | 1/1 |
| 7,680,781 B1 * | 3/2010 | Wasserman et al. ... | 707/999.004 |
| 7,680,856 B2 * | 3/2010 | Qureshi .......................... | 707/722 |
| 2002/0107835 A1 * | 8/2002 | Coram et al. ....................... | 707/1 |
| 2003/0074351 A1 * | 4/2003 | van Stegeren et al. ............ | 707/3 |
| 2004/0153343 A1 * | 8/2004 | Gotlib et al. ....................... | 705/3 |
| 2006/0259449 A1 * | 11/2006 | Betz et al. .......................... | 707/1 |
| 2008/0243799 A1 * | 10/2008 | Rozich et al. ...................... | 707/3 |
| 2009/0006491 A1 * | 1/2009 | Schwartz et al. .............. | 707/201 |
| 2010/0100836 A1 * | 4/2010 | Corella et al. ................. | 715/768 |
| 2011/0078166 A1 * | 3/2011 | Oliver et al. .................. | 707/760 |
| 2011/0276588 A1 * | 11/2011 | Moon et al. ................... | 707/769 |
| 2012/0095987 A1 * | 4/2012 | Cheng ........................... | 707/713 |
| 2012/0216114 A1 * | 8/2012 | Privault et al. ................ | 715/702 |

* cited by examiner

*Primary Examiner* — Brannon W Smith
(74) *Attorney, Agent, or Firm* — Sterne, Kessler, Goldstein & Fox, P.L.L.C.

(57) ABSTRACT

Embodiments relate to a user interface for building queries. The user may select a source or sources to be queried, and establish any number of desirable and undesirable criteria to filter the source or sources. The result set may be named with an identifier. Additional queries may be built that use previous queries as sources. The interface for building queries may be used in conjunction with electronic discovery software or document review software to filter relevant documents.

12 Claims, 9 Drawing Sheets

| BOOL OP |
|---|
| AND |
| OR |

| TYPE |
|---|
| KEEP |
| DISCARD |
| NAMED |

| SOURCE |
|---|
| all data |
| pipeline |
| external |
| account |
| userID |
| group |

| search-op |
|---|
| from-account |
| file-type |
| created-before |
| created-after |
| created-on |
| contains |
| external |

Volume(sources) >= Volume(destination)

PIPELINE QUERY INTERFACE

BACKGROUND

Electronic communication is now the primary way most business employees communicate with one another. Text documents, spreadsheets, presentations, and electronic mail (e-mail) allow users to communicate and collaborate without the delay imposed by traditional paper-based communication. E-mails and other electronic communications are a significant source of documents used as evidence in administrative proceedings, litigations, and other court proceedings. Electronic discovery tools are used in the majority of court actions to locate potentially relevant documentation.

Electronic discovery tools often store documents used in litigation and other proceedings in a database. In order to retrieve results from the database, database queries and searches are used to extract sets of electronic documents and other materials that satisfy specified search criteria for further review and analysis.

BRIEF SUMMARY

In accordance with an aspect of the invention, a corpus of documents to be filtered that are relevant to a litigation is identified. A modifiable query that identifies desired and undesired characteristics of the documents is generated. The corpus of documents is filtered in accordance with the modifiable query into a result set. The query is given a name to identify the result set for future queries.

In accordance with another aspect, a second modifiable query is generated. The second modifiable query further filters a result set of a first modifiable query into a second result set. Upon changing either the first modifiable query or the second modifiable query, the second result set may be automatically updated.

In accordance with another aspect of the invention, a method of presenting filter history to a user is described. A first modifiable query is generated. A second modifiable query is also generated to generate a result set based on the first modifiable query and the second modifiable query. Upon modification of either the first or the second modifiable query, the result set is automatically updated.

In accordance with yet a further aspect, the elements of the result set are labeled with query names.

In accordance with an aspect, each result set may include links to one or more documents stored across a plurality of user accounts.

In accordance with an aspect, each modifiable query may be used on separate document sets.

In accordance with an aspect of the invention, a user interface for query building is provided. The user interface includes a selectable area to identify a source or sources to query. The user interface also includes one or more selectable areas to specify filter criteria. Further, the user interface features a selectable area to specify a destination for the result set.

In accordance with yet a further aspect of the invention, a tool for presenting filter history to a user is provided. The tool features a first display configured to show an initial corpus of documents. The tool may also feature a second display configured to show a first modifiable query, and a third display to show a second modifiable query. Further, the tool may also feature a fourth display configured to show a named result set from the second modifiable query acting on a first result set from the first modifiable query. Each result set includes links to one or more documents stored across a plurality of user accounts.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments relate to methods and user interfaces allowing a user to view filter history and generate complex modifiable queries to view a set of documents matching specific criteria.

A consequence of today's reliance on computers in business has led the majority of discovery in litigation to be electronic discovery. This has led to a growth in the need for electronic discovery tools to manage large amounts of data and allow analysis on stored documents. In litigations and administrative proceedings, a court or other body will often compel the production of relevant documents, including electronic documents. In order to review and ultimately produce these documents, law firms and other businesses rely on electronic discovery software packages from various electronic discovery vendors.

Conventionally, an electronic discovery vendor hired by a business or law firm tasked to review documents will first create a copy of all data or a subset of data stored on user devices onto a storage device. The vendor may create a complete clone of the user device, or the vendor may extract only particular types of documents. Additionally, the vendor may create a copy of data stored on various servers used by a business, such as a mail server or web server. This process is often labor intensive and time consuming, since the vendor may have to duplicate data stored on many servers, computers, mobile devices, and other electronic communication devices.

During the collection process, electronic documents such as text files and e-mails are captured and converted into image form, such as PDF or TIFF, for future review without needing to use a native file viewer. Often, these images are accompanied with the raw text of the native file to be used while searching. One consequence of converting native files into images and raw text is that a relatively small text document may increase in file size once it is converted into an image form. Also, the raw text may lose formatting that may have been present in the original document.

Once the data is copied from user devices, the electronic discovery vendor often loads or copies the collected data (images and raw text) into a database for further analysis. Analysis may include filtering out unnecessary documents, marking or tagging particular documents that may be useful, or sending particular documents for further review. Documents are often marked, filtered or tagged in bulk by way of a query. A vendor will create a query in SQL or other similar database language, and filter or tag a number of documents matching particular criteria. Filtered or tagged documents may be relevant to a particular litigation, and may have been placed on litigation hold.

Once a document has been tagged, there may be no audit trail mechanism to determine the reason a document was tagged in a particular manner. For example, a user may run a query to determine all documents that meet the criteria of containing the words "infringement" within five words of a patent number and tag those documents as being relevant. A future user seeing documents tagged as relevant may not have insight into the mind of the original user that these documents are relevant because they contain the text "infringement" within five words of a specific patent number.

Additionally, users faced with the task of querying or filtering these large sets or databases of documents are often faced with two disparate choices. One choice is to filter or query the database using simple criteria, often leading to results sets that include either too few or too many results. A result set having too few documents risks missing important information. A result set having too many documents is often unwieldy to navigate, and it is often difficult to determine which documents are actually responsive to the entered query.

The second choice is to formulate a detailed, robust query that returns exactly the results that the user is looking for. However, such a query may be cumbersome to write. If the user is unfamiliar with the specific query language used by the database he is searching, this task will be very difficult or impossible. Future modification of the query is also time consuming.

In a hosted user environment utilizing a distributed file system, documents are not stored on individual user machines. Instead, documents and other data are distributed among various storage servers, computers, and clients in a way that the data is accessible from any network-accessible machine. A hosted user environment utilizing a distributed file system may also be known as a cloud computing environment. In a hosted user environment utilizing a distributed file system, documents generated by individual users are stored in "the cloud," or in the network of clients. The cloud refers to a makeup of networked clients, in a way such that data is accessible from any location without needing access to a specific physical machine. In some implementations of cloud computing, instead of using a small number of very powerful machines and very large storage databases, computing power is spread across numerous less powerful machines with modest storage capacity. These less powerful machines are generally available at lower cost. Additionally, adding capacity in an environment such as this is cheaper and allows for swift increases in processor and storage capacity.

In a hosted user environment utilizing a distributed file system, data is not stored on individual devices, but is rather replicated across multiple clients to allow for swift access, reliability, and backup purposes. For example, various word processing software packages exist that use cloud technology. Documents saved using such word processing software packages may be available from any computer in the world that is connected to the Internet.

In a hosted user environment, because documents are not stored on individual user devices, electronic discovery tools must be adapted to the specific characteristics of the hosted user environment. In a hosted user environment, one user's documents and data may be spread out among multiple data storage machines. Traditional cloning of user hard drives and devices and subsequent review may not be feasible in a hosted user environment.

According to an embodiment, the user is presented with an interface to build a desired query. The user may select a source or sources from which to retrieve a result set. The user may also select specified criteria that he wishes to be included in the result set, as well as select specified criteria that he wishes to be excluded from the result set. Additionally, the user can select a destination for the result set and name the result set and/or the query for future reference.

Various operators, fields, and other terms are used in the examples below. The interface may use Boolean logic, as shown in these examples and figures, or another system for logic operations known to those skilled in the art.

Figure 1:
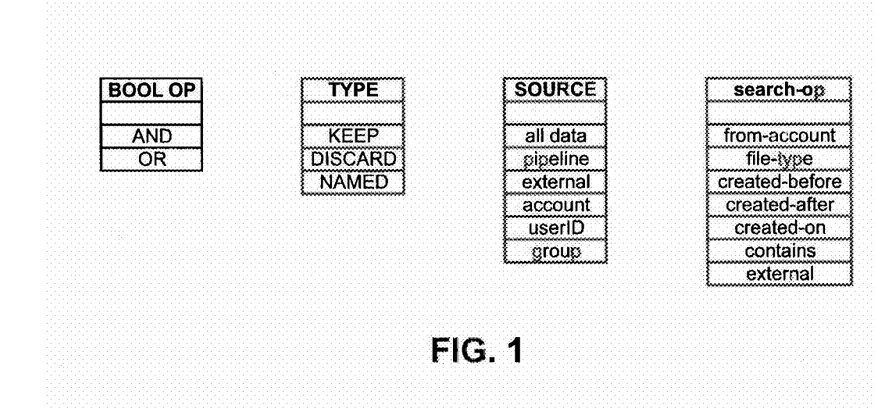
FIG. 1 is a list of exemplary operators used in accordance with various embodiments.

FIG. 1 presents a non-exhaustive list of the types of fields that may be used in various embodiments and their potential values. The BOOL OP field may include, for example and without limitation, "AND," "OR," or any other applicable logic operator. The TYPE field may include, for example and without limitation, "KEEP," "DISCARD", "NAMED", and other types of fields specified in various embodiments. The SOURCE field may include, for example and without limitation, "all data", "pipeline", "external", "account", etc. The search op field may include, for example and without limitation, "from-account", "file-type", "created-before", "created-after", "created-on", "contains", "external" or any other field desired by an embodiment.

Figure 2:
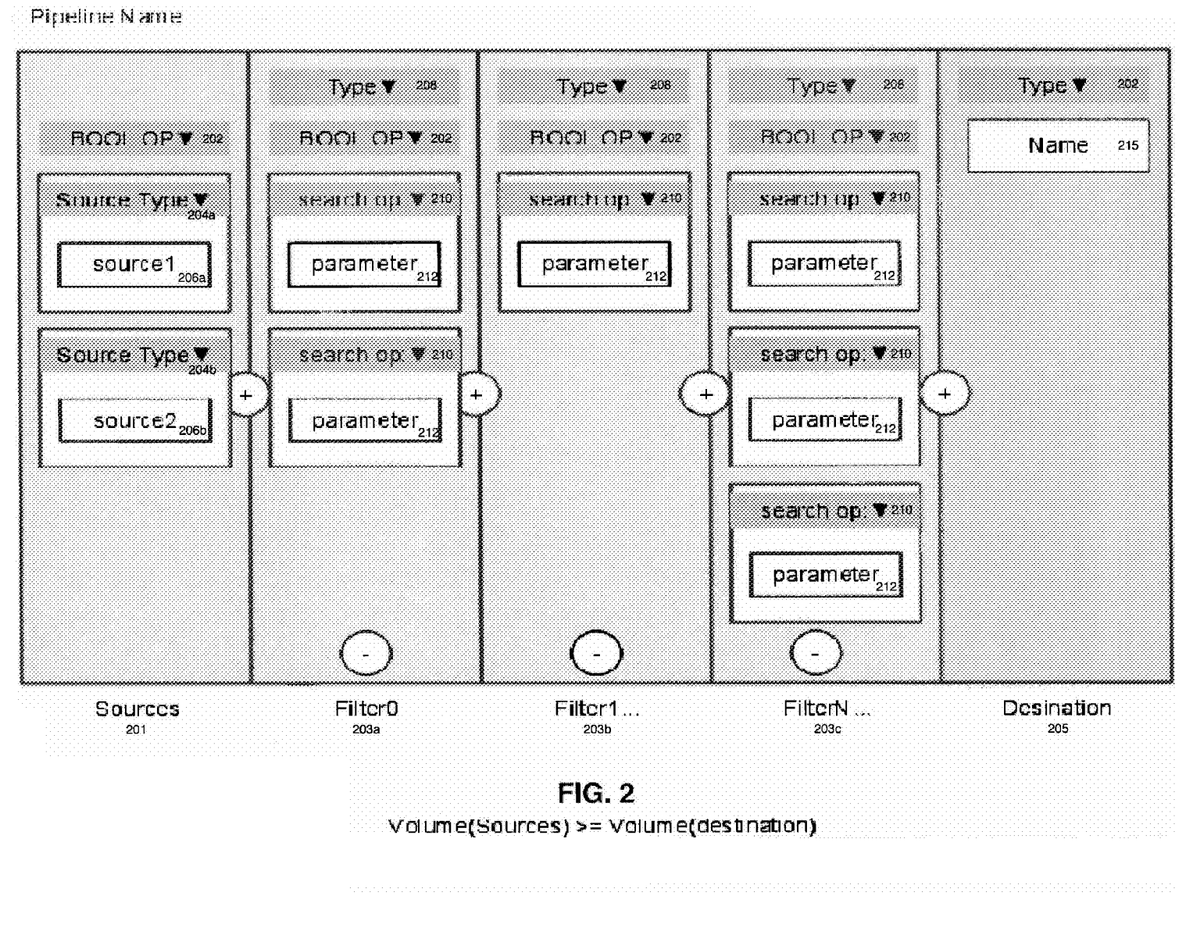
FIG. 2 is an exemplary template for a pipeline query interface in accordance with various embodiments of the present invention.

A representative template for the query builder interface, according to an embodiment, is shown in FIG. 2. FIG. 2 shows the various operations, field names, and other criteria used to create a query in accordance with embodiments of the invention. The BOOL OP field 202 may be used in either the source column 201 or a filter column 203*a*, 203*b* or 203*c*, and may display a value of, for example, "AND," "OR," or other applicable boolean logic operators. In source column 201, each Source Type selector 204*a* and 204*b* may designate an account as a source, all data in a particular environment, an external source, another query as a source, or any other source employed by the query builder interface. The source of the documents may be documents on litigation hold or documents believed to be relevant to a particular litigation. Once the Source Type is selected, applicable criteria, for example, an account name or other query name, are specified to denote the source of the query in boxes 206*a* and 206*b*.

One or more filter columns 203 may be used in a given query. In filter columns 203*a*, 203*b*, and 203*c*, a type of operation 208 may be selected. Although FIG. 2 shows three filter columns, embodiments described herein may use more or fewer filter columns. The type field 208 may be used to specify a name for a query, or may specify whether to keep or discard filter criteria further specified in filter columns 203*a*, 203*b* and 203*c*. As stated above, an applicable operator is specified in the BOOL OP field 202. Filter column 203*a* also includes selectors for search operations ("search op" 210). The "search op" field 210 may specify filter criteria to be applied to the source of documents, such as a file type, a date of creation or modification, data to be searched in the documents, or other criteria used for filtering. Each "search op" field 210 to be used may be provided with one or more parameters 212 to identify the filter criteria. A given filter column 203 may have one or more "search op" and parameter values.

Destination column 205 may specify a name for the query. In destination column 205, the BOOL OP field 202 may be changed to the "NAMED" selector, and the Name field 214 may be filled in with the desired name of the query.

Figure 3:
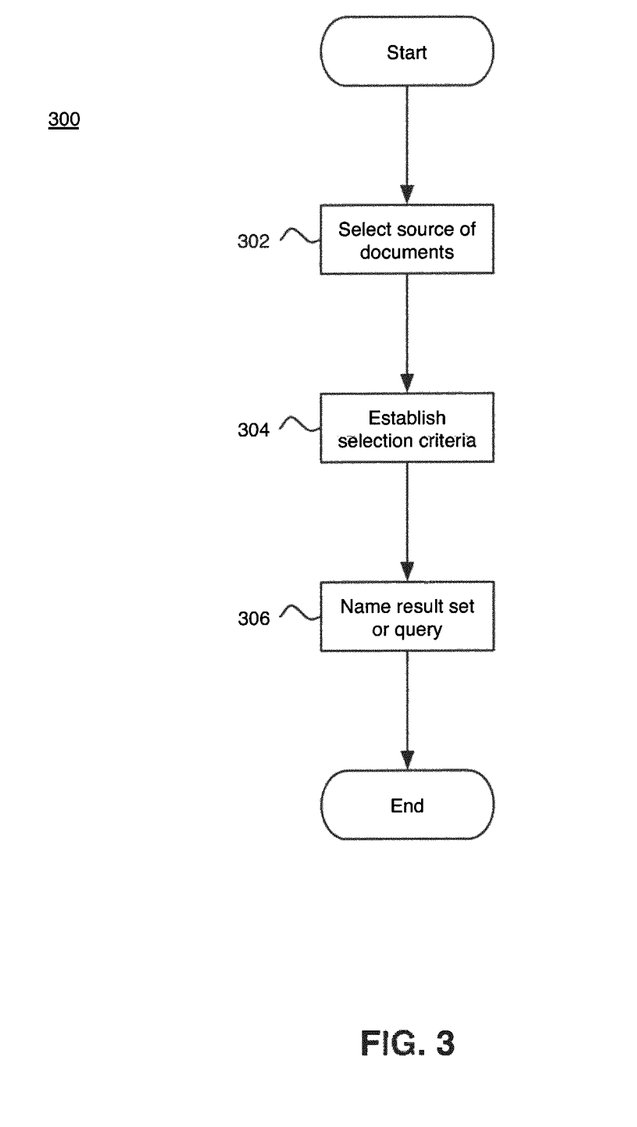
FIG. 3 is a diagram of a method of creating a query in accordance with embodiments of the invention.

FIG. 3 is an illustration of a method 300 for building a query in accordance with an embodiment. In block 302, a source of documents or data is selected. The source may be all data in a company's possession, a particular query, data from one or more particular accounts, or one or more other sources. The source may contain documents on litigation hold or documents relevant to a litigation.

In block 304, one or more selection criteria are established. For example, criteria may be specified to return documents of a certain type, such as a spreadsheet or audio file. Other criteria may be specified as well. For example, criteria specifying that a document contain a particular string of text may be specified. Additionally, a type of operation may be established in block 304. The type may be set to keep the document meeting the specified criteria or discard such documents. Block 304 may establish multiple criteria for the particular iteration of method 300.

In block 306, the result set is given a name. The name may specify details about the criteria specified in block 304, or may have other significance.

Figure 4:
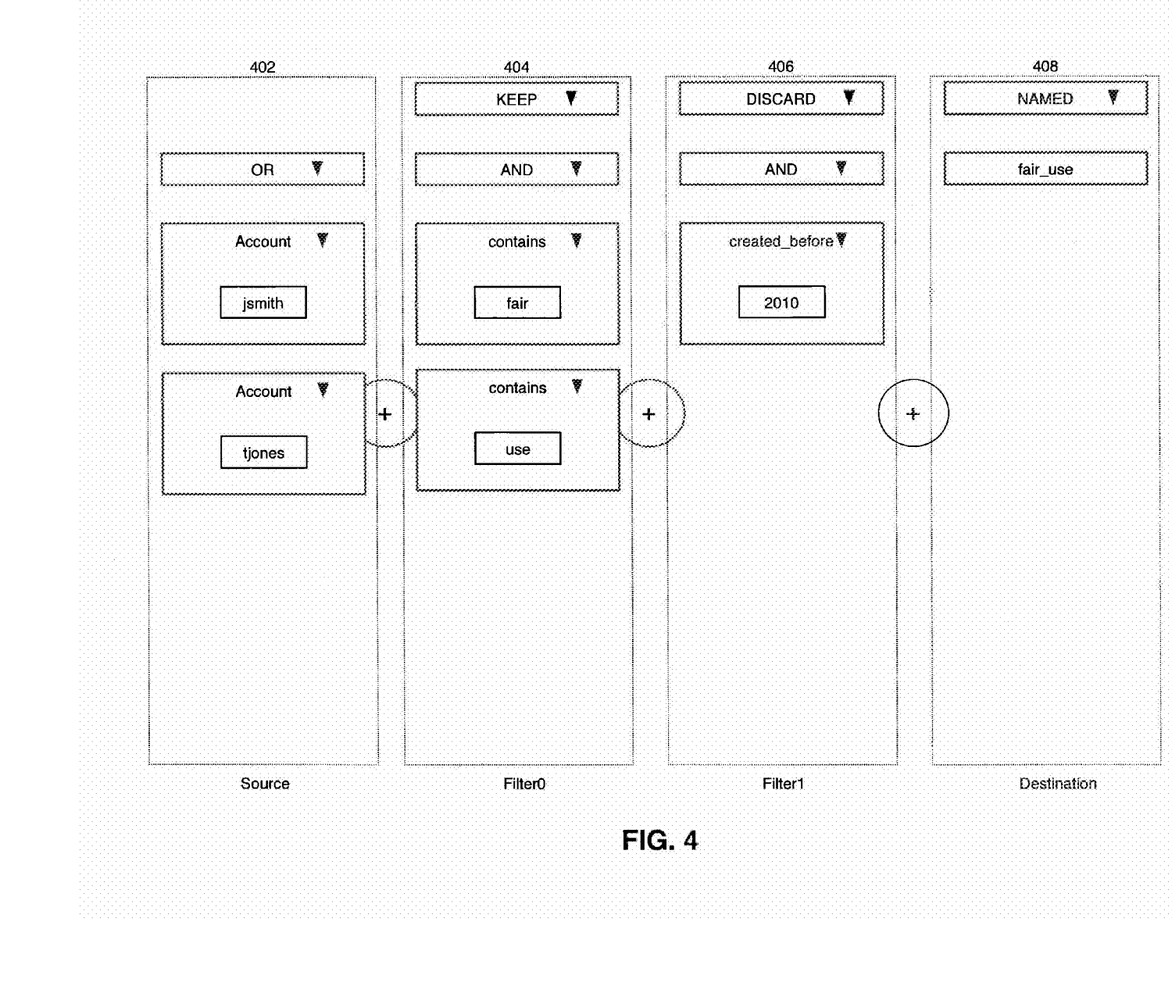
FIG. 4 is an example of a query created in accordance with embodiments of the invention.

FIG. 4 is an illustration of a query built in accordance with an embodiment. In FIG. 4, a query is built in accordance with method 300 of FIG. 3. In this example, a query is built to include all documents from accounts jsmith and tjones that reference the phrase "fair use", created before 2010. Accounts jsmith and tjones may have been identified as containing documents on litigation hold or otherwise relevant to a litigation.

In column 402, the source or sources of documents may be selected in accordance with block 302 of method 300. In the source column, using the "account" Source Type selector, the sources are specified to be accounts "jsmith" and "tjones."

Using the BOOL OP selector, the "OR" operator is selected because the desired documents are in either user account. Below the "OR" operator, the Account source is selected for each account name, and the account names are entered. Documents in the chosen user accounts may be stored on a plurality of clients in a hosted user environment utilizing a distributed file system. For example, documents of user account "tjones" may be distributed across, for example and without limitation, eight separate storage clients in a hosted user environment.

In filter column 404, various document criteria that are desired are specified, in accordance with block 304 of method 300. Because these criteria are desired in the query results, the "KEEP" operation is selected as the Type value. In this example, documents containing the words "fair" and "use" are desired. Thus, at the top of column 404, the "AND" operator is selected in the BOOL OP selector. The search op operation is chosen to be "contains" to include documents that contain the desired words, and the words "fair" and "use" are entered under each "search op" selector.

In filter column 406, document criteria to be excluded is specified, also as in accordance with block 304 of method 300. Thus, the DISCARD operation is selected as the type value. In this example, documents created before 2010 are to be excluded. Below, the "created before" specifier is selected, and the year "2010" is entered to signify documents created before 2010.

In the present example, one column of desired criteria and one column of undesirable criteria are specified. However, this example is not meant to be limiting in any way. In other uses of the query builder interface, only one column of desired criteria may be specified, or multiple columns of desired and undesirable criteria may be specified.

Finally, in column 408, a name is given to the result set, as in block 306 of method 300. In this example, the result set is named "fair_use." Thus, the "Named" operator is selected, and the text "fair_use" is entered. The examples are not meant to be limiting in any way, but merely to serve as examples of an embodiment.

The result set may provide a list of the documents returned by the query. Additionally, the result set may include links to each individual document returned by the query. For example, if the documents are distributed across one or more storage clients, the links may allow a user to access each document regardless of its storage location. In this way, documents returned by the query can be reviewed regardless of their location in a business's computing environment, and accessed in their native location.

To create the query, the columns may be combined using Boolean algebra. A query created as a result of the above example may read (from-account:jsmith or from-account: tjones) AND (contains:fair and contains:use) AND NOT (created-before:2010). Other methods of combining the criteria known to those skilled in the art may be used without limitation.

The user may also create a second query. The second query is built in a similar fashion to the first query described above. In this example, the query may specify that an existing pipeline query is to be used as its source in accordance with block 302 of method 300.

Figure 5:
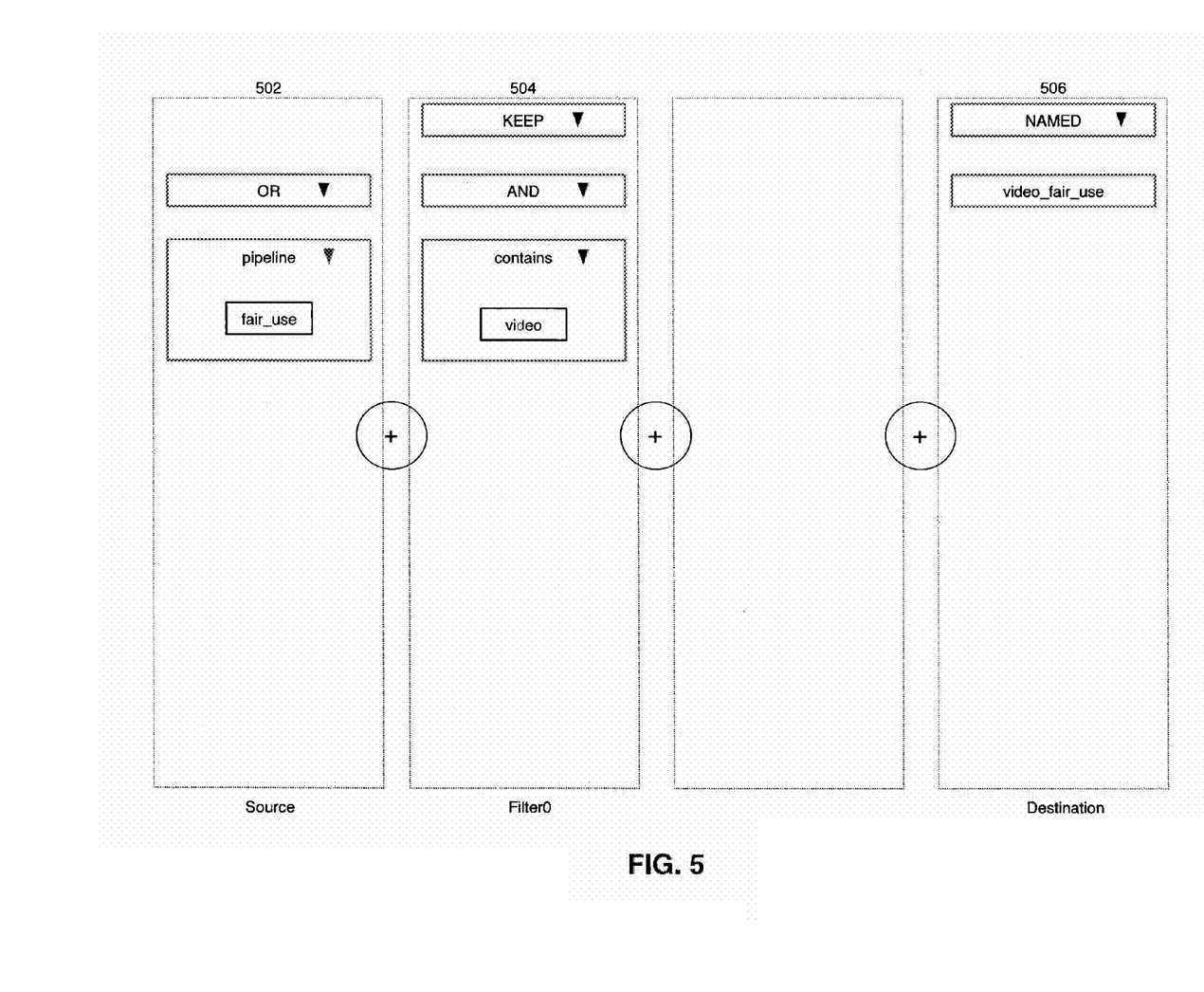
FIG. 5 is an example of a query created in accordance with embodiments of the invention.

In column 502, the source of documents may be selected in accordance with block 302 of method 300. Following the above example, in the source column, using the "pipeline" source type selector, the source is specified to be pipeline "fair_use." In this way, the second query may use the result set of the first query as a source. This allows a user to further filter the result set of an existing query for a specified review of documents. Additionally, using the result set of another query as a source may eliminate the need for a user to duplicate previous work. If, for example, the fair_use query is already existing, the user can build upon the results of that query to generate a second query specific to his uses. Additional sources may be specified in column 502 as well.

In filter column 504, document criteria that are desired are specified, in accordance with block 304 of method 300. Because these criteria are sought in the query results, the "KEEP" operation is selected as the type value. In this example, documents containing the word "video" are desired. Thus, the search op operation is chosen to be "contains" to include documents that contain the desired words, and the word "video" is entered under the "search op" selector.

In this example, only one column of filter criteria is used, and undesired filter criteria are not specified. However, as explained with respect to FIG. 4, additional desired and undesired filter criteria may be specified.

Finally, in column 506, a name is given to the result set, as in block 306 of method 300. In this example, the result set is named "video_fair_use." Thus, the "Named" operator is selected, and the text "video_fair_use" is entered. The examples are not meant to be limiting in any way, but merely to serve as examples of an embodiment.

Figure 6:
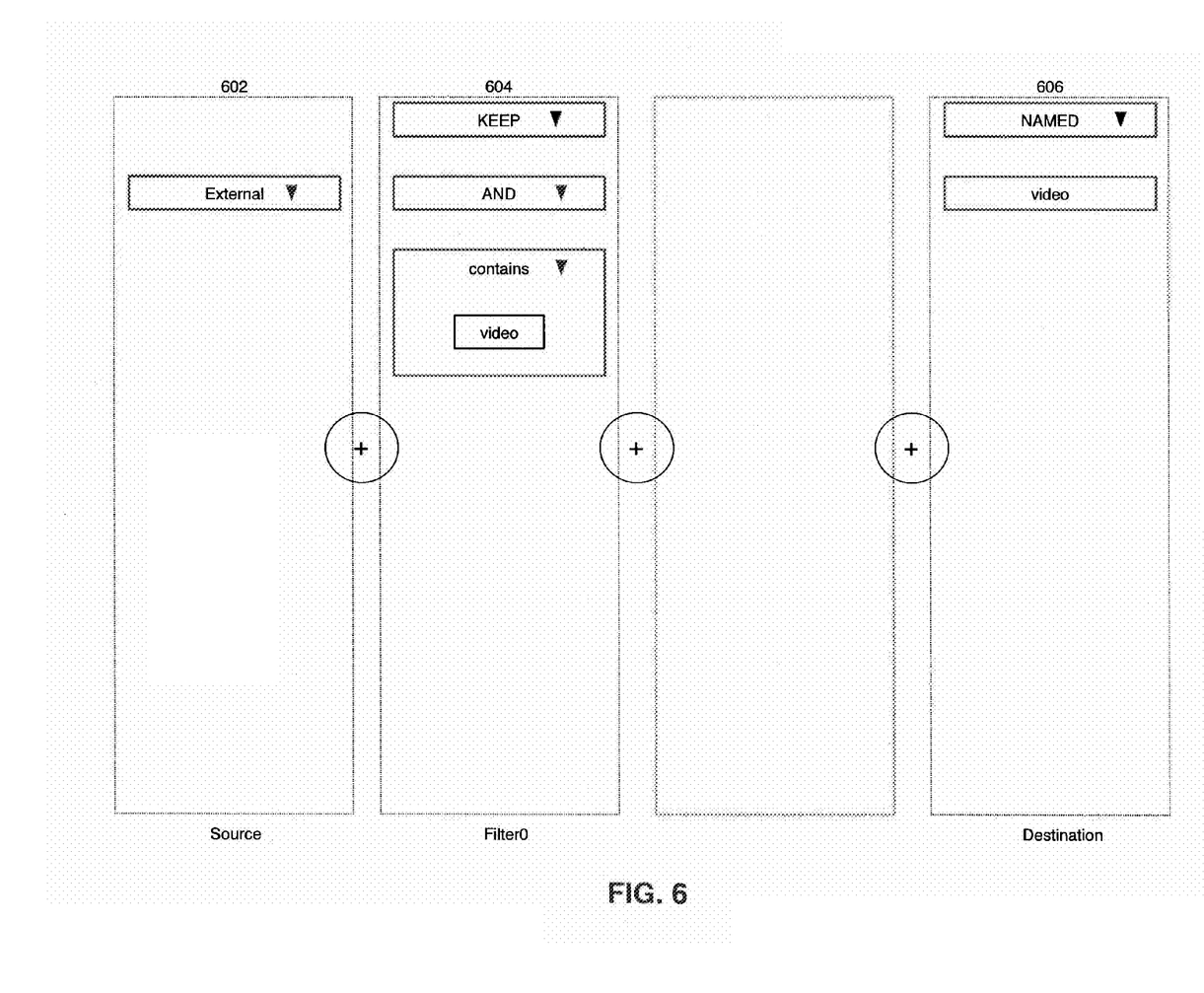
FIG. 6 is an example of a query created in accordance with embodiments of the invention.
Figure 7:
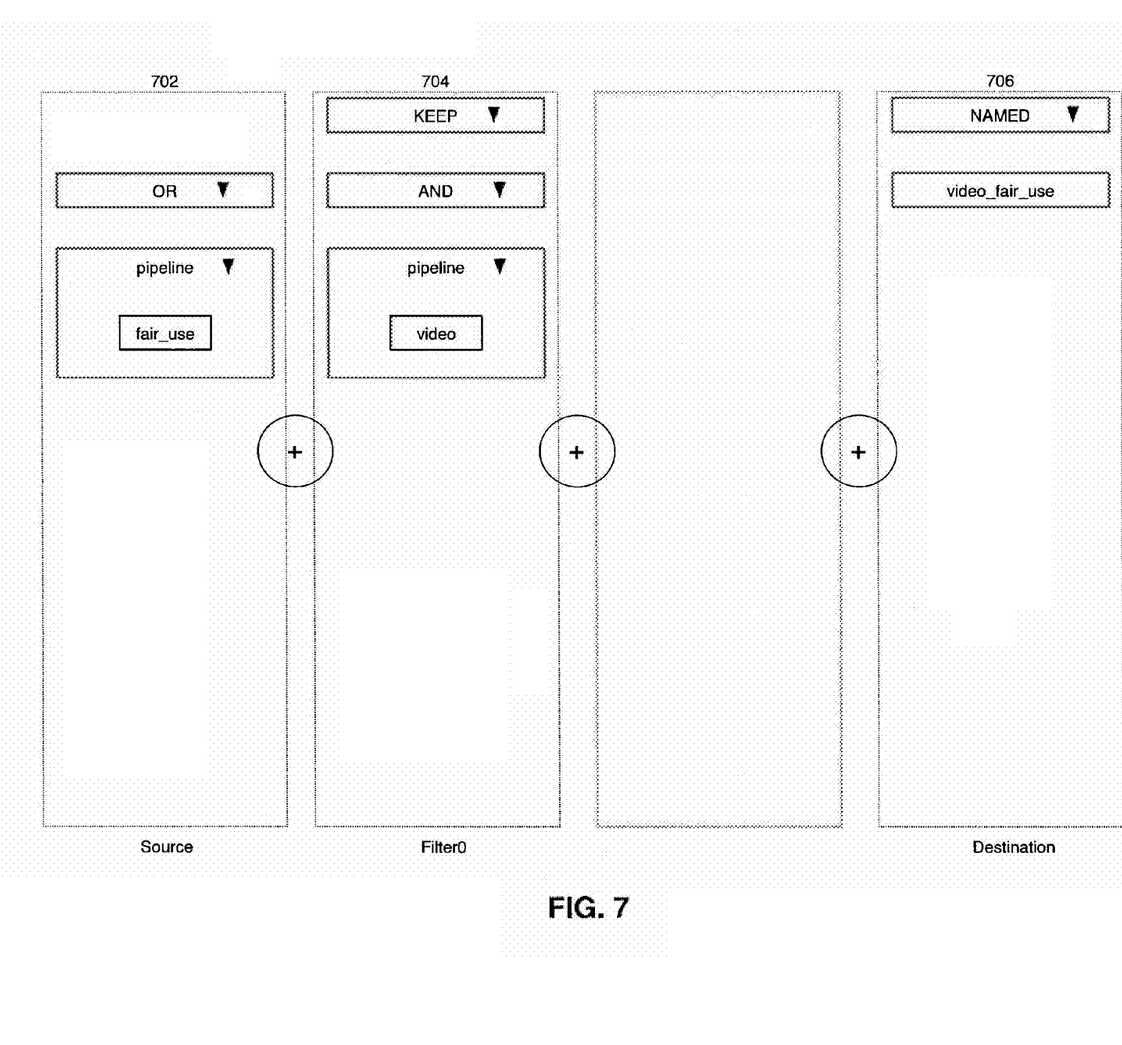
FIG. 7 is an example of a query created in accordance with embodiments of the invention.

Alternatively, the query may simply specify that an external source is to be used as its source. Such a query is illustrated in FIG. 6. In FIG. 6, the source of the query is specified as "External," which may allow the query to be used in conjunction with any other query to form a result set. In an embodiment, both queries may be used in conjunction to build a third query. FIG. 7 is an illustration of such an embodiment. In column 702, as in FIG. 2, a source or sources are specified. In this example, the source is the query "fair_use" established and defined in FIG. 4. In column 704, a second query is specified to further filter the source results. In this example, the query identified in FIG. 6, "video," is specified. The result set may be named as well, for example, "video_fair_use," as shown in destination column 706. In this way, a query that retrieves all documents from user accounts "jsmith" and "tjones" referencing fair use and videos may be found.

The examples of FIG. 5 and FIG. 7 may be useful in a number of situations. For example, if the result set of the "fair_use" query is frequently useful, additional queries may be built to further filter the result set for specific uses. In this example, the "fair_use" query is used as a source of a query to find documents referencing video and fair use. In other uses, the "fair_use" query may be used as a source for a query further specifying documents referencing music or news articles. Such queries, if written manually, may require elaborate knowledge of a query programming language beyond that of a non-technical user. However, the embodiments described herein allows a non-technical user to build a complicated query without query language experience.

In an embodiment, the user may modify the criteria specified in either query. In this example, the first query shown in FIG. 4 may be updated to add "ajohnson" as a source of documents. In an embodiment, the result set of the combined queries illustrated in FIG. 5 or FIG. 7 may automatically update with the documents or data matching both queries. In a further embodiment, the result set of the combined queries may be updated in response to a user clicking a button, such as an "Update Now" button.

In an embodiment of the invention, created queries or fragments of queries can be stored for future access. In this way, these queries or fragments of queries can be modified in the future to accommodate changes to desired results. For example, a user may identify in the future a new search term that should be included in query "fair_use." If a combined query such as "video_fair_use" exists, and the user modifies query "fair_use," then the results of the "video_fair_use" query may be appropriately updated without additional involvement by the user.

In an embodiment, the query building interface may be used in conjunction with electronic discovery software to return documents relevant to a particular subject. As described with respect to the above examples, a set of documents matching the "video_fair_use" query may then be labeled with the name of the query. A user viewing a document labeled as such may be able to interact with the label, such as but not limited to clicking or hovering his mouse over the label, and determine the underlying query that was used to label the document with the particular label. In an embodiment, labels are not stored with the documents, but rather presented along with the document as a result of a particular query.

In an embodiment, stored queries may be run periodically on databases of documents or a hosted user environment to determine documents that may be useful in future litigations. For example, a query may be built that matches a list of words common to documents relevant in a patent litigation. Thus, if a document is created with those words, it may automatically be labeled and would be easily accessible if a patent litigation were to be filed. Further, because a created query may be used as the source to a further query, a second query may be built using the first query as a source. Additional specific criteria, such as a patent number, may be specified in the second query. In this way, the execution time of the second query may be shortened because the larger set of potentially relevant files is already labeled. In an embodiment, if the query exists at the time of document creation, the document may be automatically labeled with the query name or other identifier as changes are committed to the document.

In an embodiment, a query created in accordance with the various embodiments may be used on separate sets of documents. For example, the "video_fair_use" query may initially be run on a set of electronic mail. A situation may arise where additional documents are found that may be relevant to a particular matter. Thus, the "video_fair_use" query may be used on a set of text documents or presentations to determine additional documents that should be reviewed. In a further embodiment, particular queries may be applicable to specific document sets.

In a document review environment, certain reviewers may be assigned "buckets" or sets of documents to review. These buckets may be assigned according to various desired criteria. For example, a reviewer with technical expertise may be assigned documents that reflect technical subjects. In another example, certain reviewers may be prohibited from viewing confidential or other sensitive documents.

Embodiments may be useful to establish document buckets for document reviews. A legal department may have 10 reviewers assigned to review a set of documents relevant to a litigation. The query builder interface may allow a non-sophisticated user to specify buckets of documents to be assigned to particular reviewers.

In an embodiment, queries may be re-used from matter to matter. For example, if a query is built to identify relevant documents in a patent litigation, the same query may be useful in a future litigation. Thus, queries may be stored and easily accessible for future matters.

In an embodiment, frequently used queries or query fragments can be stored by a system in cache or other quickly accessible area of memory. In this way, if the system determines that users use a particular query frequently, the resulting set can be retrieved quickly and used without unnecessary delay.

Figure 8:
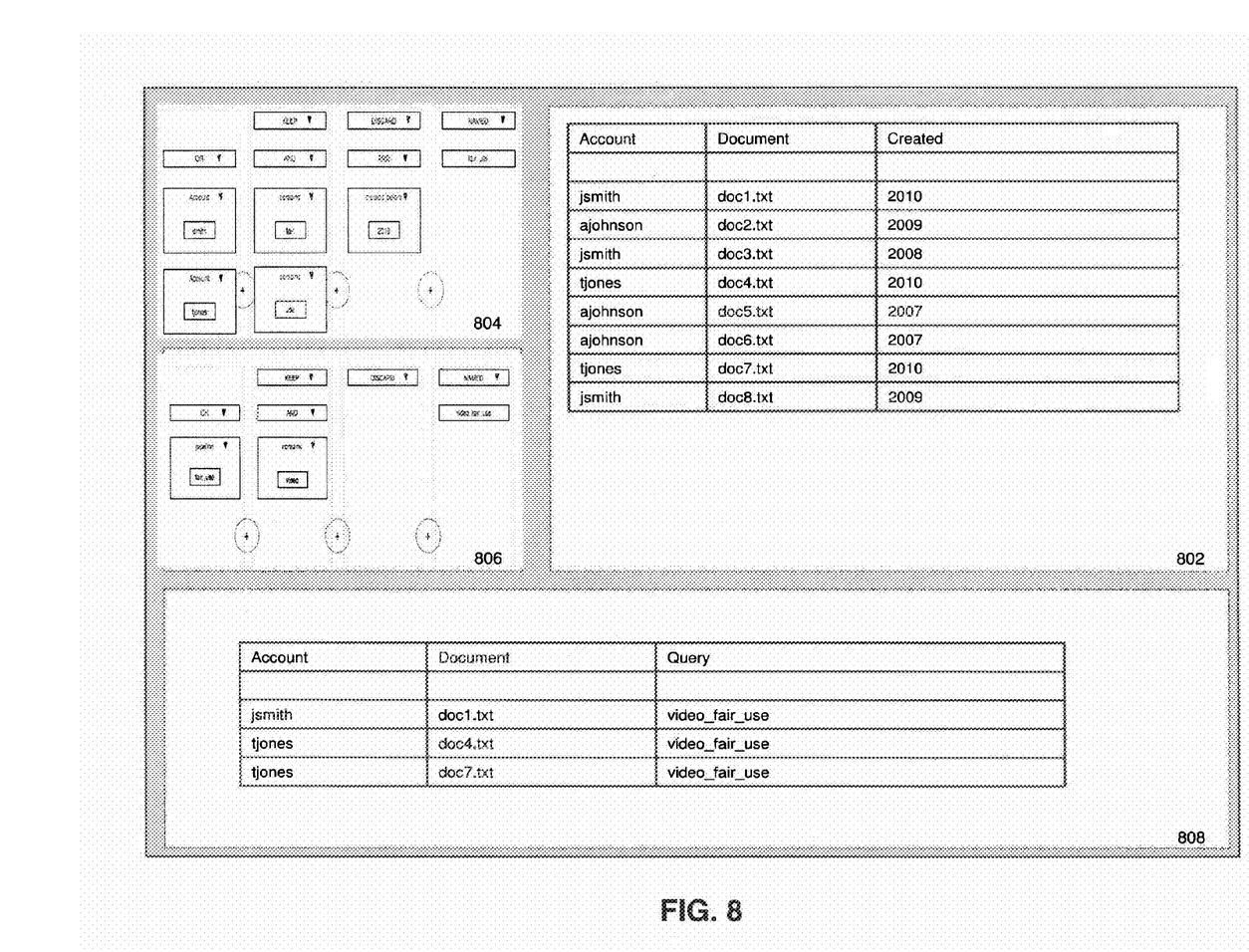
FIG. 8 is an illustration of a tool in accordance with embodiments of the invention.

In an embodiment, a tool is provided for building one or more queries and displaying results. Such an exemplary tool is illustrated in FIG. 8. Display area 802 may initially display the initial corpus of documents to be filtered through a created query. For example, display area 802 may show a set or subset of documents in a company that require review for a litigation. These documents may be contained in a database, across a plurality of user accounts, or any other location in a company's network. In the example of FIG. 8, display area 802 contains a list of documents stored across three user accounts.

Display area 804 may allow a user to create a query in accordance with embodiments described herein, such as the embodiments described in FIG. 2, to create a query as in FIG. 3. In this example, display area 804 shows the "fair_use" query detailed in the above examples.

Display area 806 may allow a user to create a second query in accordance with FIG. 2 (such as the query shown in FIG. 5) to further filter the corpus of documents displayed in display area 802. In this example, display area 806 displays the "video_fair_use" query created as in the above examples.

Display area 808 may display a result set of documents from corpus 802 filtered through queries formulated in display areas 804 and 806. In a document review environment, the result set contained in display 808 may contain links to documents such that a reviewer may view a document. These documents may be stored, for example, across a plurality of clients in a hosted user environment utilizing a distributed file system. For example, documents doc1.txt, doc2.txt, doc3.txt and doc 8.txt may be stored on a separate client from doc4.txt, doc5.txt, doc6.txt and doc7.txt. Thus, each row of the result set contained in display 808 may serve as a link or include a link to the individual files in their native environment. Thus, individual files may be reviewed in place, without needing a copying operation before review can take place. In this way, the pipeline query interface may be able to access all documents in a business utilizing a distributed file system.

In the example detailed herein, display area 808 shows a set of results that may occur after the "video_fair_use" query is applied to the set of documents contained in display area 802.

The tool of FIG. 8 may allow the user to modify queries shown in display areas 804 and 806 in accordance with the various embodiments to change the result set of documents shown in display area 808.

Figure 9:
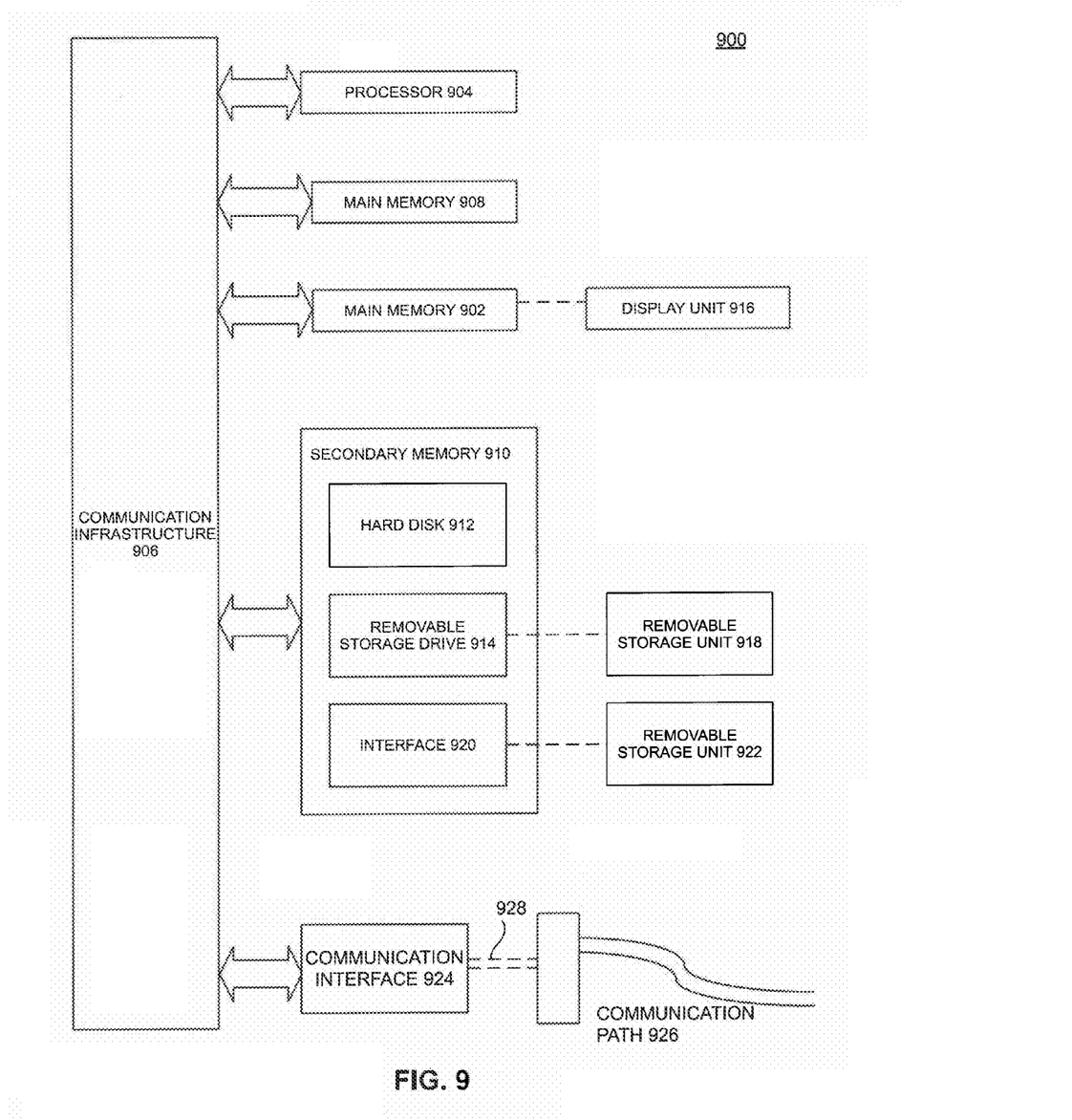
FIG. 9 is a diagram of an example computer system that can be used to implement an embodiment of the present invention.

Various aspects of the present invention can be implemented by software, firmware, hardware, or a combination thereof. FIG. 9 illustrates an example computer system 900 in which the embodiments, or portions thereof, can be implemented as computer-readable code. For example, document review tool 800 carrying out method 300 of FIG. 3 can be implemented in system 900. Various embodiments of the invention are described in terms of this example computer system 900.

Computer system 900 includes one or more processors, such as processor 904. Processor can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive and/or a removable storage drive. Removable storage drive 914 may include a floppy disk drive, a magnetic tape drive, an optical disk drive, a flash memory, or the like. The removable storage drive 914 reads from and/or writes to removable storage unit 918 in a well known manner. Removable storage unit 918 may include a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, a hard disk installed in hard disk drive 912, and signals carried over communication path 926. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the embodiments as discussed herein. In particular, the computer programs, when executed, enable processor 904 to implement the processes of the present invention, such as the steps in the method illustrated by flowchart 300 of FIG. 3 discussed above. Accordingly, such computer programs represent controllers of the computer system 900. Where embodiments are implemented using software, the software may be stored in a computer program product and loaded into computer system 900 using removable storage drive 914, interface 920, hard drive 912 or communications interface 924.

In an embodiment, the database of problematic phrases may reside on primary storage 908, secondary storage 910, or may reside on other storage connected via communications interface 924.

Embodiments may also be directed to computer products comprising software stored on any computer usable medium.

Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed:

1. A method of filtering a corpus of documents relevant to a litigation, comprising:
    identifying the corpus of documents to be filtered, wherein the documents are relevant to a litigation;
    generating a first modifiable query, wherein the first modifiable query comprises desired characteristics of the documents in the corpus;
    filtering the corpus of documents in accordance with the first modifiable query into a first result set;
    naming the first result set of the first modifiable query with a first name that identifies the first result set;
    generating a second modifiable query, wherein the second modifiable query comprises desired characteristics of the documents in the first result set;
    filtering the first result set in accordance with the second modifiable query to generate a second result set based on the first modifiable query and the second modifiable query, the filtering the first result set further comprising:
        applying the second modifiable query to the first result set by using the first result set, specified by the first name that identifies the first result set, as a source of documents for the applying the second modifiable query;
    naming the second result set with a second name that identifies the second result set;
    labeling elements of the second result set with the second name that identifies the second result set, wherein the labeling enables presentation of the first and second modifiable queries in response to a user selection;
    determining a change in either the first modifiable query or second modifiable query; and
    automatically updating the second result set, without additional user involvement, to reflect the change in either the first modifiable query or the second modifiable query.

2. The method of claim 1, wherein the first modifiable query further comprises undesired characteristics of the documents in the corpus.

3. The method of claim 1, wherein the second modifiable query further comprises undesired characteristics of the documents in the first result set.

4. The method of claim 1, wherein each result set includes links to one or more documents stored across a plurality of clients.

5. The method of claim 1, wherein each modifiable query may be used on separate document sets.

6. A system for presenting filter history to a user, comprising:
    a memory;
    at least one processor coupled to the memory;
    a first display area configured to show an initial corpus of documents relevant to a litigation;
    a second display area configured to show a first modifiable query;
    a third display area configured to show a second modifiable query; and
    a fourth display area configured to show a named result set from the second modifiable query acting on a first result set from the first modifiable query with a name that identifies the first result set,
    wherein each element of the named result set is labeled with a respective label of the name that identifies the named result set, the respective label enabling presentation of the first and second modifiable queries in response to a user selection, and
    wherein each result set includes links to one or more documents relevant to the litigation that are stored across a plurality of clients, the tool further configured to:
        determine a change in either the first modifiable query in the first display area or the second modifiable query in the second display area, and
        automatically update the named result set, without additional user involvement, to reflect the change in either the first modifiable query or second modifiable query.

7. The system of claim 6, wherein the second display area and third display area each comprise:
    a selectable area to identify a source or sources to query;
    one or more selectable areas to specify filter criteria; and
    a selectable area to specify a destination for the result set.

8. A non-transitory computer readable storage medium having a plurality of instructions stored thereon that, when executed by one or more processors, cause the one or more processors to execute a method of filtering a corpus of documents, comprising:
    identifying a corpus of documents relevant to a litigation to be filtered;
    generating a first modifiable query, wherein the first modifiable query comprises desired characteristics of the documents in the corpus;
    filtering the corpus of documents in accordance with the first modifiable query into a first result set;
    naming the first result set of the first modifiable query with a first name that identifies the first result set;
    generating a second modifiable query;
    filtering the first result set in accordance with the second modifiable query to generate a second result set based on the first modifiable query and the second modifiable query, the filtering the first result set further comprising:
applying the second modifiable query to the first result set by using the first result set, specified by the first name that identifies the first result set, as a source of documents for the applying the second modifiable query;
naming the second result set with a second name that identifies the second result set;
labeling elements of the second result set with the second name that identifies the second result set, wherein the labeling presents the first and second modifiable queries upon a user selection;
determining a change in either the first modifiable query or second modifiable query; and
automatically updating the second result set, without additional user involvement, to reflect the change in either the first modifiable query or the second modifiable query.

9. The computer readable storage medium of claim 8, wherein the first modifiable query further comprises undesired characteristics of the documents in the corpus.

10. The computer readable storage medium of claim 8, wherein the second modifiable query further comprises undesired characteristics of the documents in the first result set.

11. The computer readable storage medium of claim 8, further comprising instructions that, when executed by the one or more processors, cause the one or more processors to include links to one or more documents stored across a plurality of clients, in each result set.

12. The computer readable storage medium of claim 8, further comprising instructions that, when executed by the one or more processors, cause the one or more processors to use each modifiable query on separate document sets.

* * * * *